C. A. THYSELL.
LATHE DOG.
APPLICATION FILED OCT. 11, 1916.
1,227,219.  Patented May 22, 1917.
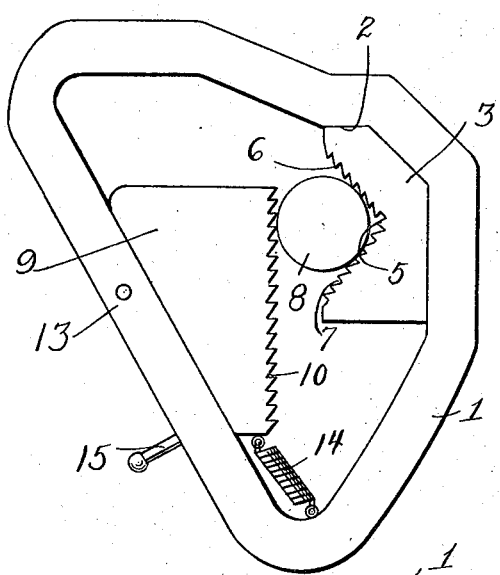
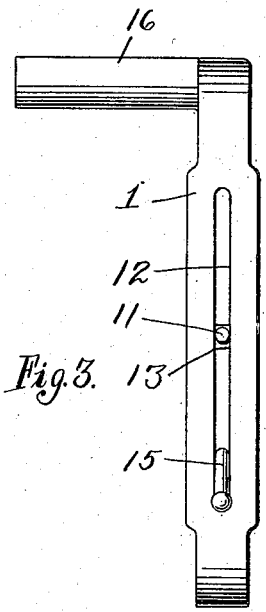
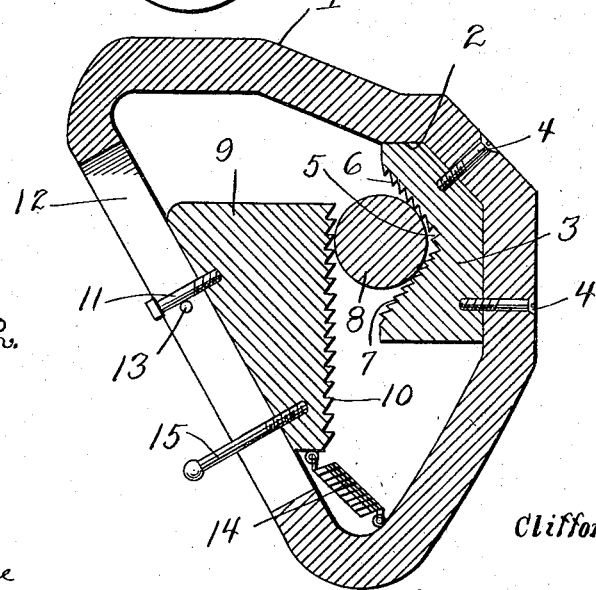
WITNESSES
INVENTOR
Clifford A. Thysell
BY
ATTORNEY

UNITED STATES PATENT OFFICE.

CLIFFORD A. THYSELL, OF ROCKFORD, ILLINOIS.

LATHE-DOG.

1,227,219.     Specification of Letters Patent.     Patented May 22, 1917.

Application filed October 11, 1916. Serial No. 125,063.

*To all whom it may concern:*

Be it known that I, CLIFFORD A. THYSELL, a citizen of the United States, residing at Rockford, in the county of Winnebago and State of Illinois, have invented certain new and useful Improvements in Lathe-Dogs, of which the following is a specification.

The present invention has reference generally to lathe dogs, and more particularly has reference to an automatically adjusted lathe dog.

Heretofore, it has been the custom to provide lathe dogs with manually operable means for adjustably engaging a piece of work or stock to cause the latter to be removably held in the dog so as to rotate with the dog and the lathe spindle. The present invention however, as its principal object consists in the provision of novel means for automatically engaging and holding the piece of work, consequently causing a saving of time by the mechanic and enabling him to work with more rapidity.

It has also been an objectionable feature of prior lathe dogs to include a set screw for clamping the work or stock, the head of the screw projecting from the dog in such a manner as to engage and tear the apparel of the mechanic, and it is an equally important object of this invention to construct the clamping means to obviate this occurrence.

More particularly, the present invention embraces the provision of novel work clamping jaws, one of which is movable with respect to the other, novel resilient means acting in conjunction with the movable jaw to cause the latter to automatically adjust itself on the piece of work and thus coöperate with the rigid jaw to hold the work.

Further and more specific objects of the invention reside in the provision of means for retaining and guiding the movable jaw on the frame of the dog; and to provide means whereby to limit the movement of the movable jaw.

Among the other aims and objects of the present invention may be recited the provision of a device of the character mentioned with a view to compactness, the number of parts of which are few, the construction simple, the cost of production low and the efficiency high.

Other improvements and novel details in the construction and arrangement of the various parts of the device will be brought out more in detail in the description to follow, which, for a clear understanding of the invention, should be considered in connection with the accompanying drawings forming a part hereof, and wherein is disclosed, for the purpose of illustration, a convenient and satisfactory embodiment of the invention. It is to be noted, in this connection, that minor changes in the construction and arrangement of the parts may be made without departing from the spirit of the invention, as set forth in the claims or the principle of operation of the various parts.

The preferred embodiment of the invention is clearly illustrated in the accompanying drawings, in which:—

Figure 1 is a front elevation of my invention,

Fig. 2 is a side elevation thereof, and

Fig. 3 is a longitudinal section of the invention.

Similar characters of reference are employed in all of the above described views, to indicate corresponding parts.

Referring now, more particularly, to the accompanying drawings, 1 indicates a frame which may be, and preferably is, of a substantially triangular configuration having a portion of one side adjacent the vertex opposite the longest side offset to provide a shoulder 2. A rigid jaw 3 is arranged on the inside of the frame within the plane of the outer sides of the frame and is held against the vertex and the shoulder 2 by means of suitable fastening devices such as screws 4 which pass through the frame and engage the rear edge of the jaw. The outer edge of the jaw is provided with a substantially V-shaped recess 5 while the edges of the recess are provided with teeth 6 and 7. The teeth 6 project toward the teeth 7 but the latter project toward the outer edge of the recess or jaw for a purpose that will presently appear.

With a view toward providing suitable means for automatically engaging and holding a piece of wood 8 I have provided my improved movable jaw which may be and preferably is of a triangular configuration as indicated by the numeral 9. The outer face of the jaw 9 is provided with a plurality of teeth 10 which when the rear edge or face of the jaw 9 is arranged against the longest side of the frame 1, project toward the teeth 6 of the rigid jaw so as to effectively engage the piece of work 8. A screw 11 is slidably arranged in a longitudinal slot 12 in the longest side of the frame and has the inner end thereof engaged in the rear edge of the jaw 9 for guiding the sliding movement of the said jaw, while the head of the screw is arranged against the outer edge of the said slot so that the screw will also retain the jaw against accidental displacement. A pin 13 extends transversely through the frame and the slot 12 to serve as a stop for limiting the inner movement of the jaw. A coil spring 14 has the respective ends connected to the narrow end of the jaw 9 and to the side of the frame adjacent the longest side and indicated in Fig. 2 of the drawings. In order to remove the jaw 9 I have provided a round headed handle 15 the inner end of which is removably engaged in the rear edge of the jaw 9, said handle being incidentally arranged through the slot 12 to coöperate with the screw 11 in guiding the sliding movement of the jaw.

An arm 16 extends from the frame and is adapted for engagement with the slotted face plate on the spindle of a lathe, whereby the lathe dog and the teeth held by it are caused to rotate coincident with the lathe spindle in a manner well known to machinists or others conversant with the use of such tools.

The operation of the invention may be reviewed as follows:—

Assuming that the parts have been assembled in the manner described the handle 15 is engaged and the jaw 9 thus moved toward one side of the frame and away from the jaw 3 the sliding movement of the jaw being guided by the screw 11 and the handle 15. The handle is now released and the spring 14 exerts its tension on the jaw to automatically cause the teeth 10 to adjustably engage the piece of work 8 which has previously been arranged in the recess 5. Because of the arrangement of the teeth 6, 7 and 10 the piece of work is effectively retained in a substantially rigid position in respect to the dogs. As intimated the screw 11 retains the dog on the frame and the pin 13 limits the movement of the said dog.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense. It is also to be understood that certain changes in the construction, combination and arrangement of parts may be resorted to that fall within the legitimate scope of the appended claims.

Having described my invention, what I claim as new and desire to secure by Letters Patent is:—

1. A lathe dog comprising a frame, a rigid jaw mounted on the frame, a portion of the frame extending at an angle inclined relative to the gripping face of the jaw, said jaw having a substantially flat surface having a recess therein with its walls serrated with teeth, a movable jaw slidably mounted on the inclined portion of the frame and having a serrated gripping face arranged and adapted to remain at all times in parallelism with the said flat surface of the rigid jaw, and means normally tending to move said movable jaw on said inclined face toward said rigid jaw to coöperate therewith.

2. A lathe dog including a substantially triangular frame, a rigid gripping jaw mounted within the frame and arranged to oppose one of the sides thereof, a movable gripping jaw, means for slidably connecting the movable jaw with the side of the frame opposing said rigid jaw, and means normally tending to move the movable jaw on the frame toward said rigid jaw to coöperate therewith.

3. A lathe dog including a substantially triangular frame one side of which is provided with a longitudinal slot, a rigid jaw mounted within the frame and opposite the slot a triangular jaw, means passing through the slot for slidably connecting the movable jaw to the frame, resilient means for automatically drawing the movable jaw into engagement with a piece of work adapted to be previously mounted in the rigid jaw, and means for disengaging the movable jaw.

4. A lathe dog including a triangular frame having a longitudinal slot in the longest side thereof, a rigid jaw mounted in the frame opposite the slot, a movable jaw arranged within the frame coöperating with the rigid jaw means passing through the slot for slidably connecting the movable jaw with the frame, means coöperating with the connecting means for limiting the movement of the movable jaw, resilient means for drawing the movable jaw into adjustable engagement with a piece of work adapted to be placed in the rigid jaw, and means disengaging the movable jaw.

5. A lathe dog including a substantially triangular frame, a rigid jaw mounted within the frame and provided with a V-shaped recess, teeth on the sides of the recess, the teeth on one side projecting toward the opposite side and the teeth on the outer side projecting toward the outer end of the recess, a movable jaw slidably mounted in the frame and coöperating with the rigid jaw for clamping a piece of work, a plurality of teeth on the outer edge of the movable jaw and projecting toward the first mentioned teeth, and resilient means connected to the frame and to the movable jaw for automatically drawing the movable jaw into adjustment for engaging a piece of work.

In testimony whereof I affix my signature in presence of two witnesses.

CLIFFORD A. THYSELL.

Witnesses:
ALMA THYSELL,
JOHN E. HULTBERG.

Copies of this patent may be obtained for five cents each, by addressing the "Commissioner of Patents, Washington, D. C."